United States Patent
Murray et al.

(10) Patent No.: US 8,767,229 B2
(45) Date of Patent: Jul. 1, 2014

(54) POWER FOR WIRELESS PRINTER DURING SLEEP MODE

(75) Inventors: Richard A. Murray, San Diego, CA (US); Susan Hajaran Tousi, Poway, CA (US)

(73) Assignee: Eastman Kodak Company, Rochester, NY (US)

( * ) Notice: Subject to any disclaimer, the term of this patent is extended or adjusted under 35 U.S.C. 154(b) by 281 days.

(21) Appl. No.: 13/430,749

(22) Filed: Mar. 27, 2012

(65) Prior Publication Data

US 2013/0258372 A1    Oct. 3, 2013

(51) Int. Cl.
*G06F 3/12*    (2006.01)

(52) U.S. Cl.
USPC ....... 358/1.13; 358/1.14; 358/1.15; 358/1.16; 358/1.18; 347/5; 713/310; 713/320; 713/323; 455/405; 455/522; 455/574

(58) Field of Classification Search
None
See application file for complete search history.

(56) References Cited

U.S. PATENT DOCUMENTS

| | | | | |
|---|---|---|---|---|
| 6,311,279 | B1 * | 10/2001 | Nguyen | 713/300 |
| 7,350,902 | B2 | 4/2008 | Dietl et al. | |
| 2011/0064445 | A1 * | 3/2011 | Yashiro | 399/88 |
| 2013/0127362 | A1 * | 5/2013 | Trainor et al. | 315/224 |
| 2013/0257930 | A1 * | 10/2013 | Murray et al. | 347/5 |

\* cited by examiner

*Primary Examiner* — Miya J Cato (74) *Attorney, Agent, or Firm* — Peyton C. Watkins (57) ABSTRACT

A printing system includes a printing device for printing onto a recording medium; a media advance system for moving the recording medium into position to be printed on by the printing device when the printing system is in an operating mode; a connector for receiving AC line voltage; a power supply for converting the AC line voltage into a plurality of DC voltages; a wireless communication device for receiving image data; a controller for controlling printer operation when the printing system is in the operating mode, and for turning off at least one of the plurality of DC voltages when the printing system is in a low power mode; and an energy storage device for powering the wireless communication device when the printing system is in the low power mode.

17 Claims, 7 Drawing Sheets

POWER FOR WIRELESS PRINTER DURING SLEEP MODE

CROSS REFERENCE TO RELATED APPLICATION

Reference is made to commonly assigned, co-pending U.S. patent application Ser. No. 13/430,756, concurrently filed herewith, entitled "Powering a Wireless Printer During Sleep Mode" by Rich Murray and Susan Tousi, the disclosure of which is herein incorporated by reference.

FIELD OF THE INVENTION

The present invention relates generally to providing power to a wireless printer, and more particularly to keeping the wireless communication device active without using the AC line power when the printer is in a low power mode.

BACKGROUND OF THE INVENTION

In recent years, increased attention has been directed toward improved energy efficiency in electronic equipment. International standards such as Energy Star provide energy consumption specifications that a product must meet if it is to be certified.

In order to reduce energy consumption, electronic equipment such as printers, typically have a normal operating mode during which prints can be made and a standby mode or a sleep mode during which prints cannot be made. In the standby or sleep mode, power is only supplied to certain key portions of the apparatus so that it is in a low power mode. For example, power can be provided to a microcontroller in sleep mode so that it is not necessary to reinitialize the firmware when it is time to re-enter normal operating mode. Thus a sleep mode provides energy savings while permitting rapid availability of the printing capability when needed. Even more power savings is possible by turning off the printer entirely, but turning the printer off results in some delay in the availability of printing capability when the printer is turned back on.

A printer typically enters the low power mode when there is no printing activity. For example, if image data is not received for printing for a predetermined period of time, the printer controller will switch the printer into a low power mode. The controller typically switches the printer back into normal operating mode when image data is received for printing, or when the user interacts physically with the printer by touching a key on the user interface for example. A special problem exists for printing systems having wireless communication capability. In this case, it is desirable to be able to send print jobs to such printing systems from remote locations for printing. If the printing system is in its operating mode, then the remotely sent print job will print out. However, for printing systems that disconnect power from the wireless communication device during a low power mode, the wireless receiver will fail to receive the remotely sent print job and therefore it will fail to print.

Consequently, a need exists for a printing system and a way to operate the printing system such that wireless communication to the printer is supported without drawing on AC line voltage in a low power mode so that energy efficiency requirements can be met without losing the ability to receive data for printing at any time.

SUMMARY OF THE INVENTION

The present invention is directed to overcoming one or more of the problems set forth above. Briefly summarized, according to one aspect of the invention, the invention resides in a printing system comprising a printing device for printing onto a recording medium; a media advance system for moving the recording medium into position to be printed on by the printing device when the printing system is in an operating mode; a connector for receiving AC line voltage; a power supply for converting the AC line voltage into a plurality of DC voltages; a wireless communication device for receiving image data; a controller for controlling printer operation when the printing system is in the operating mode, and for turning off at least one of the plurality of DC voltages when the printing system is in a low power mode; and an energy storage device for powering the wireless communication device when the printing system is in the low power mode.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
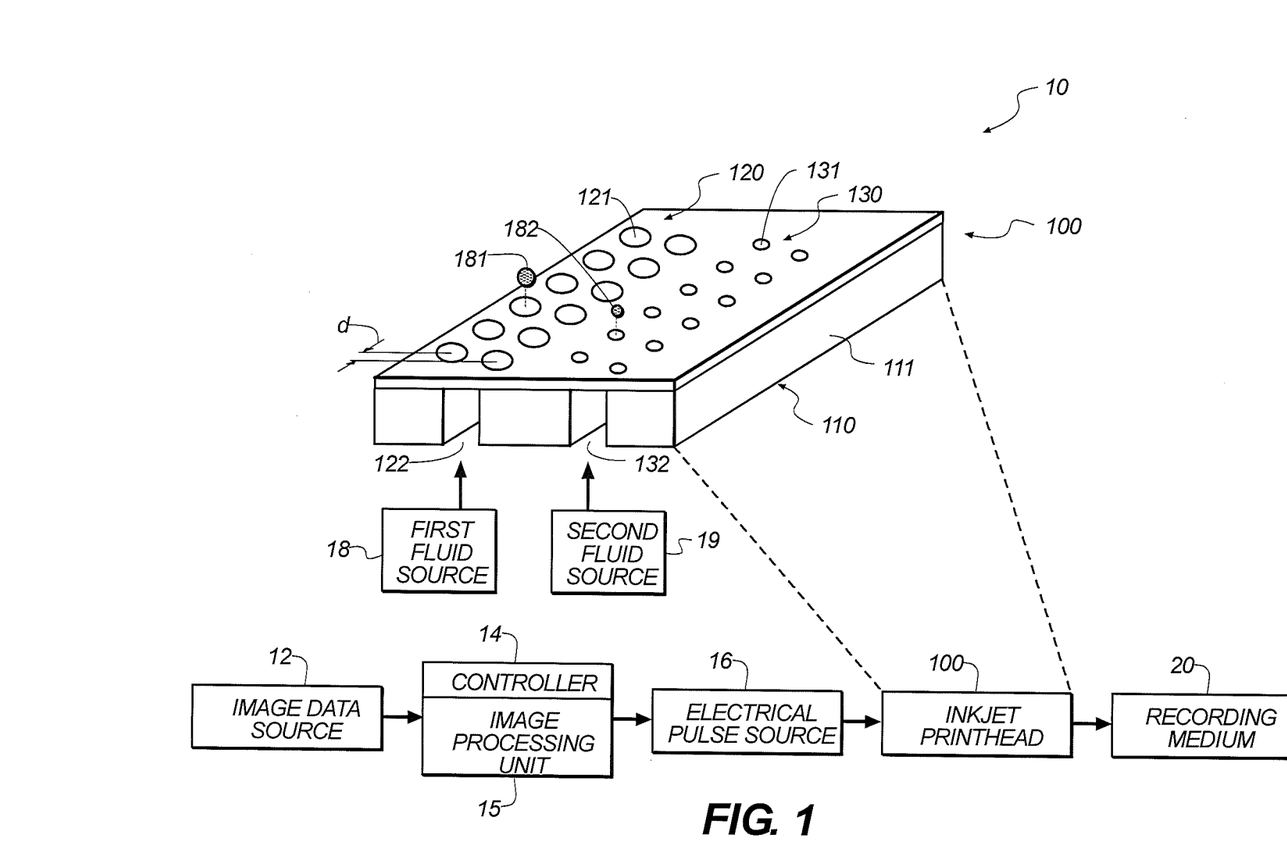
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. The inkjet printer system 10 includes an image data source 12, which provides data signals that are interpreted by a controller 14 as being commands to eject drops. The controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays 120, 130. Nozzles 121 in the first nozzle array 120 have a larger opening area than nozzles 131 in the second nozzle array 130. In this example, each of the two nozzle arrays 120, 130 has two staggered rows of nozzles 121, 131, each row having a nozzle density of 600 per inch. The effective nozzle density then in each nozzle array 120, 130 is 1200 per inch (i.e. d=$\frac{1}{1200}$ inch in FIG. 1). If pixels on a recording medium 20 were sequentially numbered along the paper advance direction, the nozzles 121, 131 from one row of the nozzle array 120, 130 would print the odd numbered pixels, while the nozzles 121, 131 from the other row of the nozzle array 120, 130 would print the even numbered pixels.

In fluid communication with each nozzle array 120, 130 is a corresponding ink delivery pathway 122, 132. The ink delivery pathway 122 is in fluid communication with the first nozzle array 120, and the ink delivery pathway 132 is in fluid communication with the second nozzle array 130. Portions of the ink delivery pathways 122 and 132 are shown in FIG. 1 as openings through a printhead die substrate 111. One or more inkjet printhead die 110 will be included in inkjet printhead 100, but for greater clarity only one inkjet printhead die 110 is shown in FIG. 1. In FIG. 1, a first fluid source 18 supplies ink to the first nozzle array 120 via the ink delivery pathway 122, and second fluid source 19 supplies ink to the second nozzle array 130 via the ink delivery pathway 132. Although distinct fluid sources 18 and 19 are shown, in some applications it can be beneficial to have a single fluid source supplying ink to both the first nozzle array 120 and the second nozzle array 130 via ink delivery pathways 122 and 132 respectively. Also, in some embodiments, fewer than two or more than two nozzle arrays 120, 130 can be included on printhead die 110. In some embodiments, all nozzles 121, 131 on the inkjet printhead die 110 can be the same size, rather than having multiple sized nozzles 121, 131 on the inkjet printhead die 110.

The drop forming mechanisms associated with the nozzles 121, 131 are not shown in FIG. 1. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from the electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on the recording medium 20.

Figure 2:
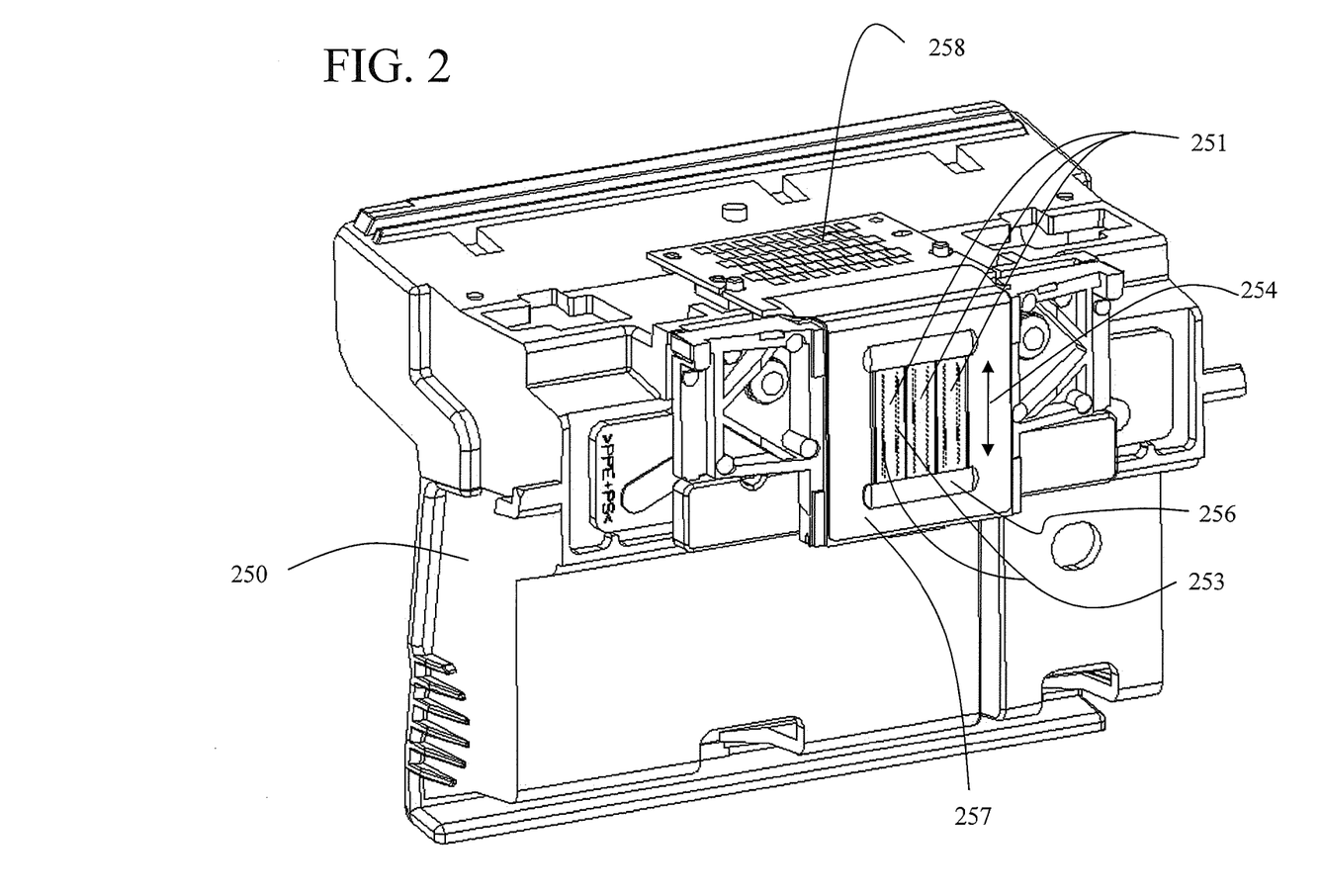
FIG. 2 is a perspective of a portion of a printhead.

FIG. 2 shows a perspective of a portion of a printhead 250, which is an example of the inkjet printhead 100. The printhead 250 includes three printhead die 251 (similar to printhead die 110 in FIG. 1), each printhead die 251 containing two nozzle arrays 253 so that the printhead 250 contains six nozzle arrays 253 altogether. The six nozzle arrays 253 in this example can each be connected to separate ink sources (not shown in FIG. 2); such as cyan, magenta, yellow, text black, photo black, and a colorless protective printing fluid. Each of the six nozzle arrays 253 is disposed along a nozzle array direction 254, and the length of each nozzle array along the nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving the printhead 250 across the recording medium 20. Following the printing of a swath, the recording medium 20 is advanced along a media advance direction that is substantially parallel to the nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. The flex circuit 257 bends around the side of the printhead 250 and connects to a connector board 258. When the printhead 250 is mounted into the carriage 200 (see FIG. 3), the connector board 258 is electrically connected to a connector (not shown) on the carriage 200 so that electrical signals can be transmitted to the printhead die 251.

Figure 3:
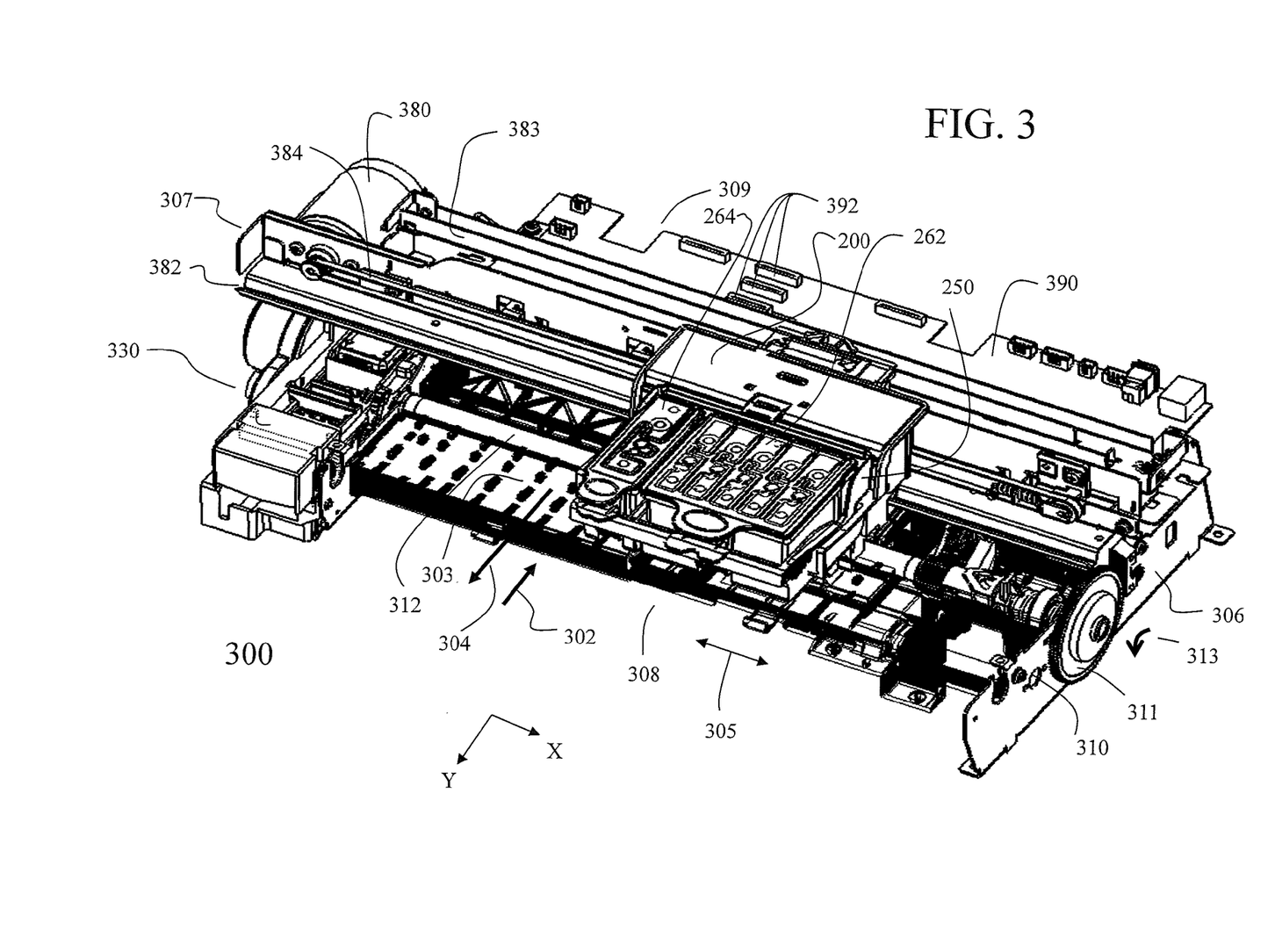
FIG. 3 is a perspective of a portion of a carriage printer.

FIG. 3 shows a portion of a desktop carriage printer. Some of the parts of the printer have been hidden in the view shown in FIG. 3 so that other parts can be more clearly seen. A printing mechanism 300 has a print region 303 across which the carriage 200 is moved back and forth in a carriage scan direction 305 along the X axis, between a right side 306 and a left side 307 of the printing mechanism 300, while drops are ejected from the printhead die 251 (not shown in FIG. 3) on the printhead 250 that is mounted on the carriage 200. A carriage motor 380 moves a belt 384 to move the carriage 200 along a carriage guide rail 382. An encoder sensor (not shown) is mounted on the carriage 200 and indicates carriage location relative to an encoder fence 383.

The printhead 250 is mounted in the carriage 200, and a multi-chamber ink supply 262 and a single-chamber ink supply 264 are mounted in the printhead 250. The mounting orientation of the printhead 250 is rotated relative to the view in FIG. 2, so that the printhead die 251 are located at the bottom side of printhead 250, the droplets of ink being ejected downward onto the recording medium 20 in the print region 303 in the view of FIG. 3. The multi-chamber ink supply 262, in this example, contains five ink sources: cyan, magenta, yellow, photo black, and colorless protective fluid; while the single-chamber ink supply 264 contains the ink source for text black. Paper or other recording medium 20 (sometimes generically referred to as paper or media herein) is loaded along a paper load entry direction 302 toward a front of printing mechanism 308.

Figure 4:
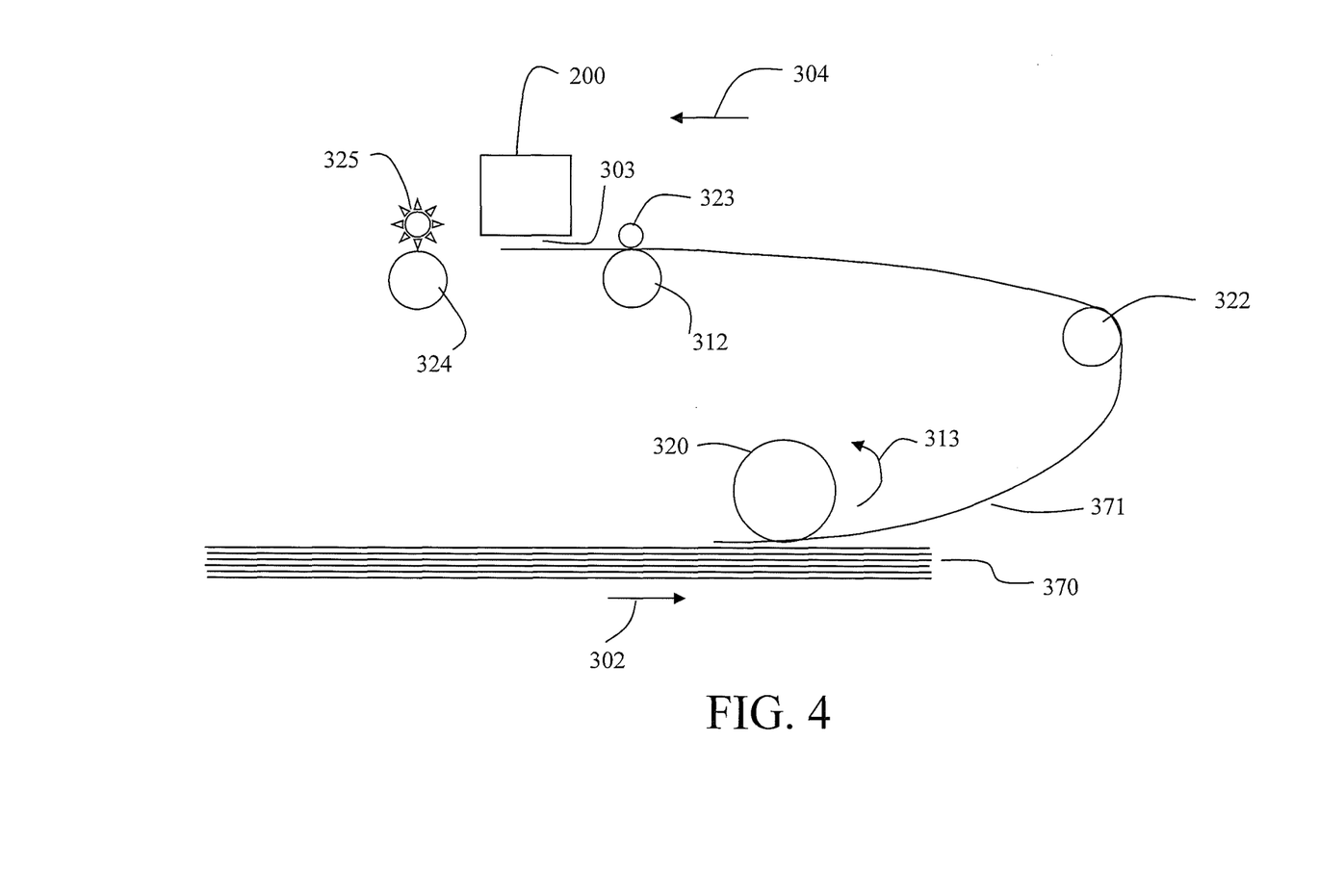
FIG. 4 is a schematic side view of an exemplary paper path in a carriage printer.

A variety of rollers are used to advance the medium through the printer as shown schematically in the side view of FIG. 4. In this example, a pick-up roller 320 moves a top piece or sheet 371 of a stack 370 of paper or other recording medium 20 in the direction of arrow, the paper load entry direction 302. A turn roller 322 acts to move the paper around a C-shaped path (in cooperation with a curved rear wall surface) so that the paper continues to advance along a media advance direction 304 from a rear 309 of the printing mechanism (with reference also to FIG. 3). The paper is then moved by a feed roller 312 and an idler roller(s) 323 to advance along the Y axis across the print region 303, and from there to a discharge roller 324 and a star wheel(s) 325 so that printed paper exits along the media advance direction 304. The feed roller 312 includes a feed roller shaft along its axis, and a feed roller gear 311 is mounted on the feed roller shaft. The feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller 312.

The motor that powers the paper advance rollers is not shown in FIG. 3, but a hole 310 at the right side 306 of the printing mechanism 300 is where the motor gear (not shown) protrudes through in order to engage the feed roller gear 311, as well as the gear for the discharge roller (not shown). For normal paper pick-up and feeding, it is desired that all rollers rotate in a forward rotation direction 313. Toward the left side 307 of the printing mechanism 300, in the example of FIG. 3, is a maintenance station 330.

Toward the rear 309 of the printing mechanism 300, in this example, is located an electronics board 390, which includes cable connectors 392 for communicating via cables (not shown) to the printhead carriage 200 and from there to the printhead 250. Also on the electronics board 390 are typically mounted motor controllers for the carriage motor 380 and for the paper advance motor, a clock for measuring elapsed time, a processor and/or other control electronics (shown schematically as the controller 14 and the image processing unit 15 in FIG. 1) for controlling the printing process, and an optional connector for a cable to a host computer.

Not shown in FIG. 3 is a wireless communication device 350 (FIG. 7) for sending image data to the controller 14 and the image processing unit 15 from remote locations without the aid of a hard-wired connection from the remote location to the printing mechanism 300. A typical wireless communication device includes a radio and associated circuitry that uses around half a watt when it is on full-time. Wireless communication devices that satisfy IEEE standards for connection to wireless local area networks are typically designated as Wi-Fi. A Wi-Fi module is typically assembled on a separate circuit board (not shown) that is connected to the electronics board 390.

Figure 5:
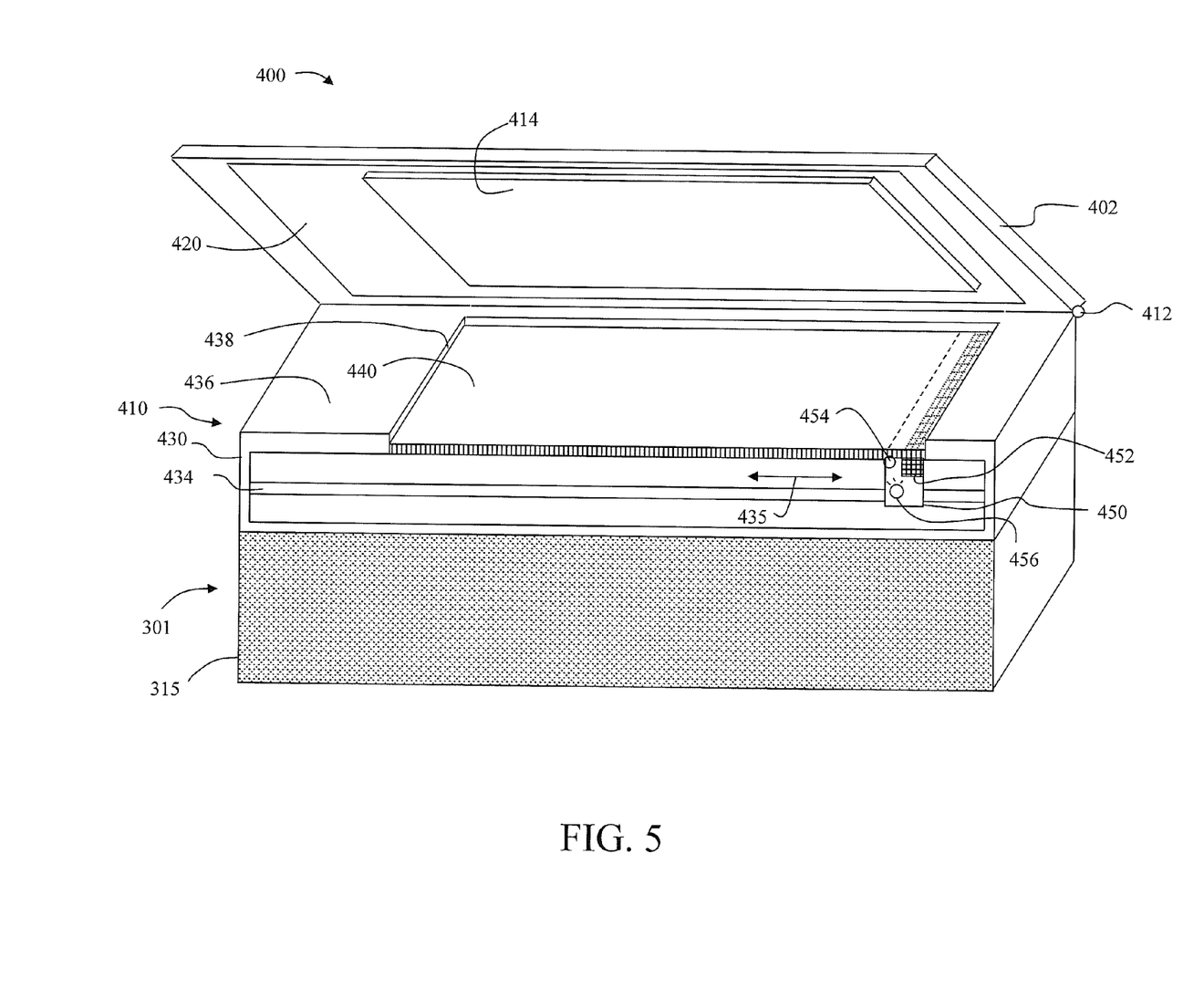
FIG. 5 is a perspective of a multifunction printing system with a solar cell built into the lid, according to an embodiment of the invention.

FIG. 5 shows a perspective of a multifunction printing system 400 having the printing apparatus 301 including a printing mechanism for printing images, such as the printing mechanism 300 (FIG. 3), enclosed within a housing 315, and also a scanning apparatus 410 for scanning documents or other items. In this view, a front portion of the scanning apparatus 410 is cut away in order to show internal features of the scanning apparatus 410 more clearly. The multifunction printing system 400 can do printing, scanning of documents, or copying of documents (i.e. printing plus scanning).

The scanning apparatus 410 includes a scanning apparatus body 430 and a lid 402, which is pivotably attached to the scanning apparatus body 430 by a hinge 412. The surface of the scanning apparatus body 430 that is covered by the lid 402 when the lid 402 is closed includes a frame 436. A transparent platen 440 (typically a flat piece of glass) is inset within the frame 436. In the example shown in FIG. 5, the surface of the transparent platen 440 is lower than the surface of the frame 436 so that there is an offset 438. The transparent platen 440 is not covered by the lid 402 when the lid 402 is open as it is in FIG. 5.

Below the transparent platen 440 is a movable sensor array module 450. In the example shown in FIG. 5, the sensor array module 450 includes a photosensor array (such as a contact image sensor) 452 extending the width of the transparent platen 440, a roller 454 that is biased into contact with the underside of the transparent platen 440, and a light source 456 that illuminates a scan line of a document or other item (not shown) that is placed on top of the transparent platen 440. A light guide and other optics (not shown) can also be included in the sensor array module 450. The sensor array module 450 is moved back and forth along a scanning guide 434 in a scanning direction 435 across the length of the transparent platen 440 in order to scan the document or other item, receiving reflected light from the item through the transparent platen 440 scan line by scan line and converting the reflected light into electrical signals. A controller (not shown) converts the electrical signals into digitized data to form a digitized image of the item. The scanning guide 434 can be a round rail, a rack and pinion or other guiding member that can use the power of a motor (not shown) to provide a linear motion along the scanning direction 435.

In the example shown in FIG. 5, the lid 402 includes a reflective backing plate 414. A thickness of the reflective backing plate 414 is accommodated in the offset 438 between the frame 436 and the top surface of the transparent platen 440 when the scanner lid 402 is closed. The reflective backing plate 414 can be resiliently mounted on the lid 402, so that the reflective backing plate 414 is effective in pressing documents of various thicknesses against the transparent platen 440. Typically the reflective backing plate 414 is white in the document scanning region. In some scanning apparatus configurations (not shown), the reflective backing function is integrated into the lid 402.

In the example shown in FIG. 5, the multifunction printing system 400 includes a control panel 340 (also called a user interface herein) having control buttons 342 and a display 344. For embodiments where the display 344 is a touch screen, the control buttons 342 can be integrated into the touch screen rather than being separate from it. In some embodiments, the control panel 340 can be a virtual front panel software application running on a mobile device, for example a smart phone, communicating to the apparatus wirelessly or by wired connection.

Figure 6:
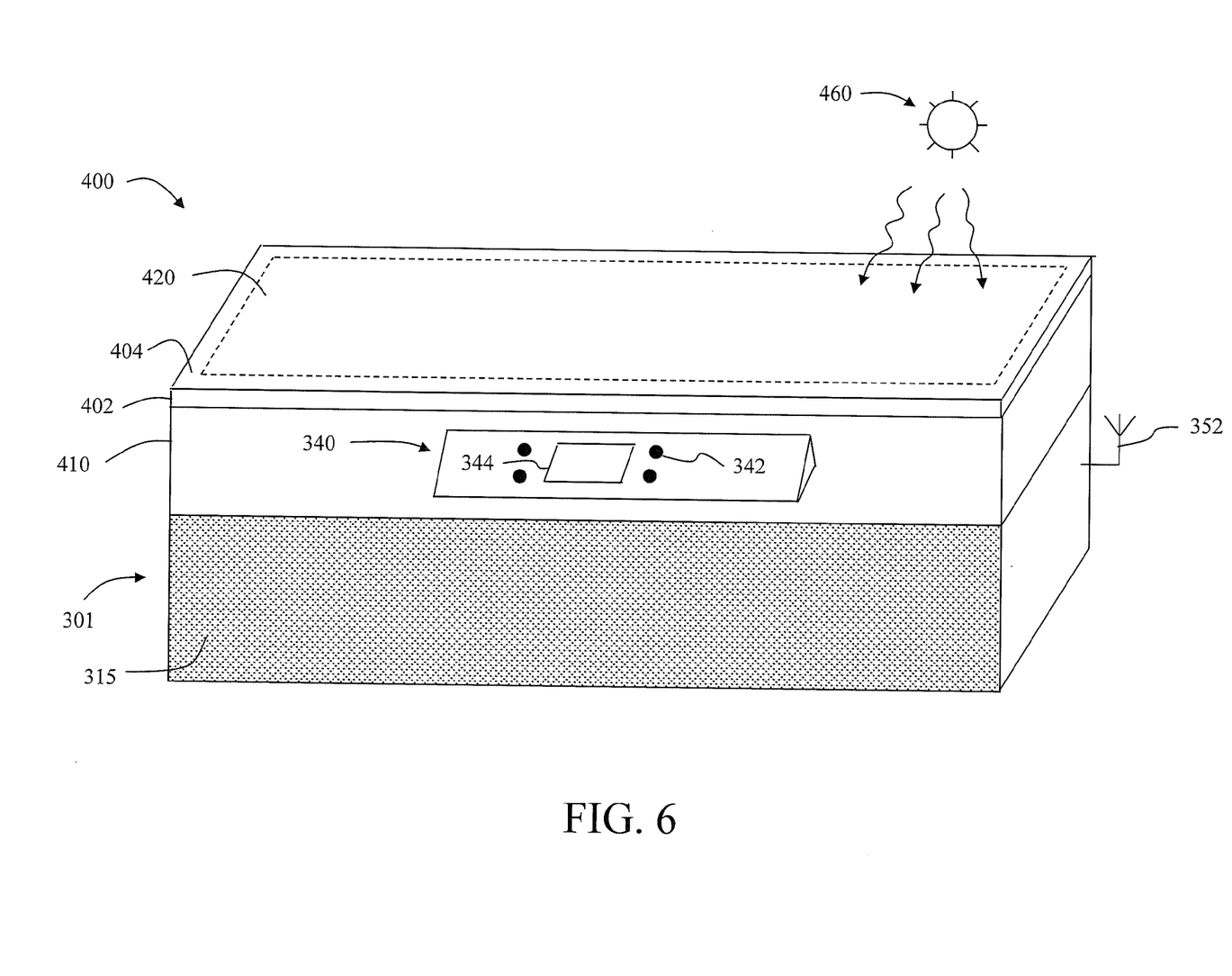
FIG. 6 is a perspective of the multifunction printing system of FIG. 5 with the lid closed.

According to an embodiment of the invention, a solar cell 420 is built into the lid 402. FIG. 6 shows a perspective of a multifunction printing system 400 with lid 402 in a closed position. Lid 402 has a transparent outer surface 404 that faces away from multifunction printing system 400. Outer surface 404 can be made of glass, for example. The solar cell 420 is built into an underside of the lid 402. The term solar cell 420 as used herein can also refer to a solar panel including a plurality of solar cells. Light from an external light source 460 illuminates the solar cell 420 through the transparent outer surface 404 so that the solar cell 420 generates electrical energy locally at the site of the multifunction printing system 400, locally generated electrical energy. The external light source 450 can include daylight or artificial lighting that is used for indoor lighting, such as fluorescent lighting or incandescent lighting. Also shown in FIG. 6, but hidden in FIG. 5, is an antenna 352 for the wireless communication device 350 in the multifunction printing system 400.

Figure 7:
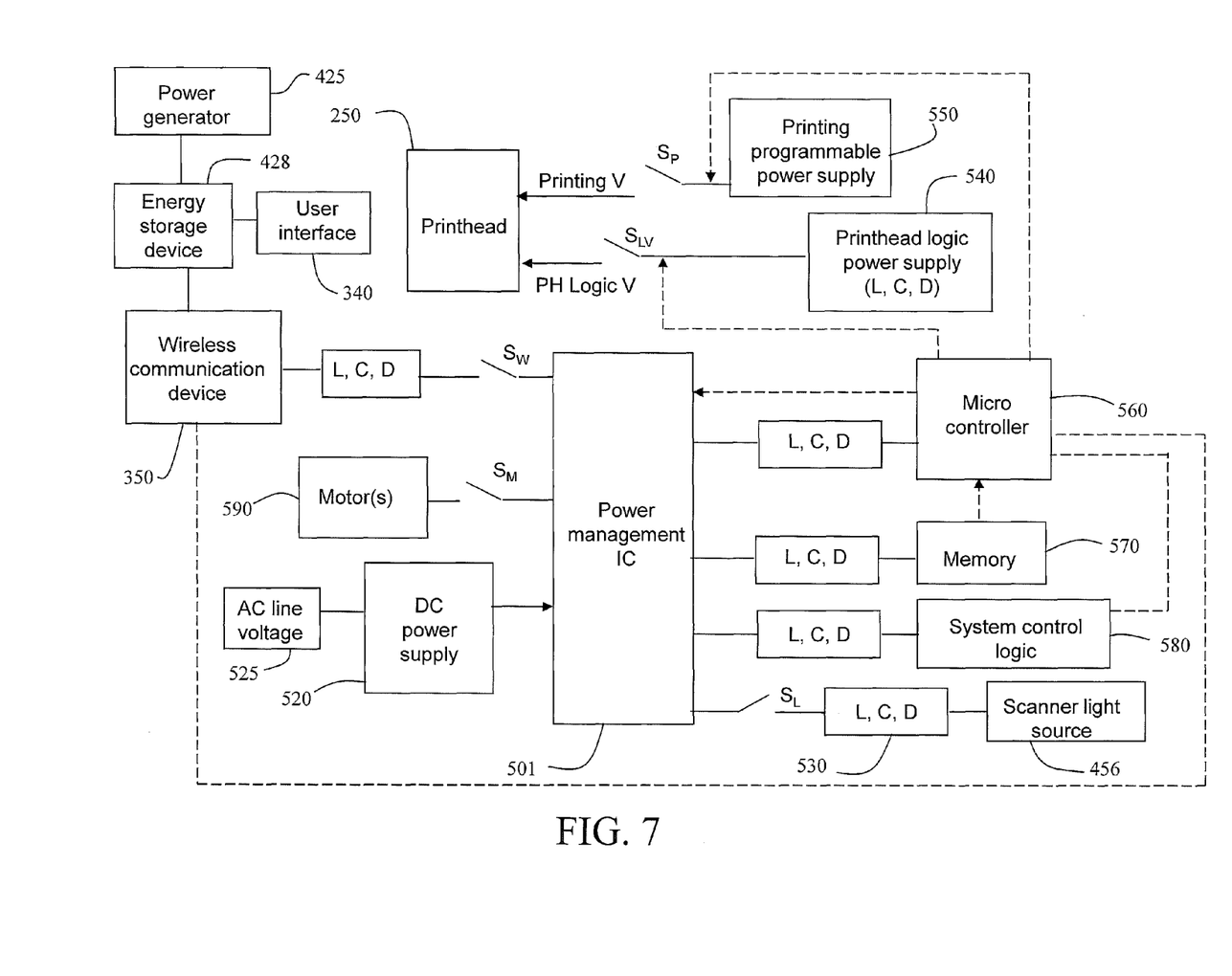
FIG. 7 is a block diagram of power management and communication circuitry for a multifunction printing system having a wireless communication device.

A block diagram of an example of a portion of power management and communication circuitry for the multifunction printing system 400 is shown in FIG. 7. Communication lines between components are shown as dashed lines, while power connections are shown as solid lines. An AC line voltage 525 is connected to a DC power supply 520 by a connector (not shown). The DC power supply 520 converts the AC line voltage 525 into a regulated DC voltage that is provided to a power management IC 501. Typically, the voltage provided by the DC power supply 520 is approximately equal to the highest DC voltage required in the multifunction printing system 400. Other DC voltage levels are typically provided by DC to DC conversion. One type of DC to DC conversion circuit is a buck converter (not shown). In a buck converter, when a power transistor is turned on, current begins flowing from the input source $V_{in}$ through the power transistor, through an inductor L, through a capacitor C and into the load. The magnetic field in inductor L builds up, storing energy in the inductor. When the power transistor is turned off, inductor L opposes any drop in current by suddenly reversing its EMF. As a result, it supplies current to the load through a flyback diode D (typically a Schottky diode). The DC voltage $V_{out}$ across the load is the input voltage $V_{in}$ times the switching duty cycle. Although it is possible to provide a buck converter or other type of switching mode power supply for each of the required DC voltages, a more economical approach is to integrate some of the components for each of the DC to DC conversion circuits onto the power management IC 501. In particular, the power transistors and the switching control circuits can be incorporated into the power management IC 501. Typically, however the inductors L, capacitors C and flyback diodes D are provided as discrete components 530 for each of the different required voltages. In some embodiments a single power supply can provide all of the DC voltage levels. However, in the example of FIG. 7, the DC power supply 520, the power management IC 501, and associated discrete components 530 are included in a power supply for converting the AC line voltage 525 into a plurality of DC voltages. Power supply as used herein includes both of these embodiments.

Several different system components are shown in FIG. 7 having different DC voltage requirements. Core voltage for the system on a chip microcontroller 560 is typically around 1 volt. The microcontroller 560 (also referred to as a system on chip or SOC) not only receives its voltage input from the power management IC 501, but also communicates commands to the power management IC 501. The microcontroller 560 can include the printer control functions of controller 14 and the image processing unit 15 of FIG. 1 when the multifunction printing system 400 is in its normal operating mode. The chip microcontroller 560 also provides instructions for turning off at least one of the plurality of DC voltages when the multifunction printing system 400 enters a low power mode. A dynamic RAM memory 570 typically requires around 2 volts. A system control logic 580 (some or all of which can be incorporated on the microcontroller 560) typically requires around 3.3 volts. ROM memory typically requires around 3 volts for reading and can typically use the same DC voltage source as the system logic 580. The scanner light source 456 for the scanning apparatus 410 (FIG. 5) can require around 5 volts. For the various DC voltages provided, (for example, core voltage for the microcontroller 560, voltage for RAM memory, voltage for system control logic circuitry, etc.) the power management IC 501 provides a voltage control output that controls the switching through the corresponding discrete inductors, capacitors and diodes (i.e. the discrete components 530) to provide the appropriate DC voltage levels.

The power management IC 501 can also controllably provide power to the various motors 590 in the multifunction printing system 400, including the carriage motor 380 (FIG. 3) for moving the carriage 200, a paper advance motor (not shown) for advancing paper or other recording medium 20 through printing mechanism 300 (FIG. 3), and a scan assembly motor for the scanning apparatus 410 (FIG. 5). Some or all of these motors can be run in both forward direction and reverse direction, so the motor control circuitry in the power management IC 501 is typically more complex than simple on/off switches.

A printing device, such as the printhead 250 can require two different voltages. A first DC voltage called printing voltage is required by the dot forming elements in order to make a mark on the recording medium. For example, for a thermal inkjet printhead, the printing voltage is the voltage used in pulsing the resistive heater in order to vaporize a portion of ink and thereby cause ejection of a drop from the drop ejector. Depending on the nominal resistance of the resistive heaters on a thermal inkjet printhead, the printing voltage is typically between about ten volts and fifty volts. It is desirable to have the energy dissipated in the resistive heaters to be at or near a predetermined value, so that the heaters will reliably nucleate vapor bubbles for drop ejection without overheating the heaters. Because resistive heater power is $V^2/R$ and resistance R can vary from printhead to printhead due to manufacturing variability, a programmable power supply 550 is sometimes used to adjust the voltage V to compensate. For example, if the nominal printing voltage is 28 volts, the programmable power supply can be adjusted to provide 30 volts, for example, for a printhead having a higher than nominal heater resistance, or 26 volts, for example, for a printhead having a lower than nominal heater resistance. Typically a printing programmable power supply 550 receives its input voltage from the DC power supply 520, although that connection is not shown in FIG. 6. A second DC voltage that is required by the printheads 250 that have integrated logic circuitry is a printhead logic voltage, which is typically around 5 volts. A printhead logic DC voltage source 540 and the printing programmable power supply 550 are shown as being separate from the power management IC 501 in FIG. 6, but power transistors and switching control circuitry for these two DC voltage sources can also be partially integrated into the power management IC 501.

An on/off switch $S_P$ is typically provided between the printing programmable power supply 550 and the printhead 250, and an on/off switch $S_{LV}$ is typically provided between the printhead logic DC voltage source 540 and the printhead 250. During a low power mode such as sleep mode, after it is determined that the multifunction printer 400 has been inactive for a predetermined time period, switches $S_P$ and $S_{LV}$ can be turned off to disconnect the printhead 250 from the printing power supply 550 and the printhead logic DC voltage source 540 respectively. In this way, during periods of inactivity the amount of power that is used by the printhead 250 is limited, thereby improving energy efficiency. Similarly switches $S_M$ and $S_L$ can be turned off to disconnect the motors 590 and the scanner light source 456 from their power supplies (typically 5 volts) during the sleep mode. Prints cannot be made when the printer is in the sleep mode.

In embodiments of the invention, the wireless communication device 350 is provided for receiving image data sent to the multifunction printing system 400 either from a nearby location or from a remote location. When the wireless communication device 350 is operating continuously, it consumes around a half watt or more. Therefore it is desirable to shut off the power provided by the DC power supply 520 and the power management IC 501 from the AC line voltage 525 to the wireless communication device 350 in order to meet energy efficiency requirements. Switch $S_W$ is provided for that purpose. In conventional wireless printers, if power provided by AC line voltage through the power supply is disconnected from the wireless communication device 350 in the low power mode, the printer will not receive image data wirelessly in the low power mode. If the sender is in the same room as the multifunction printer 400, they can manually cause it to switch to normal operating mode by pressing a button on the control panel 340, for example. However, if the image data is sent wirelessly from a remote location and the printer is in the operating mode, switch $S_W$ will continue to be open and the wireless communication device 350 will not receive the image data so the print job will fail to print.

In order to meet energy efficiency requirements and also permit receiving of image data wirelessly when the multifunction printing system 400 is in a low power mode, embodiments of the present invention provide an energy storage device 428, such as a rechargeable battery or a capacitor for powering the wireless communication device 350 when the printing system is in the low power mode. A supercapacitor, also known as an electric double-layer capacitor, is one type of energy storage device 428 that can be suitable in some applications. In some embodiments the energy storage device 428 also provides power to the user interface 340, including the display 344 for example, when multifunction printing system 400 is in the low power mode. In some embodiments it is preferred that the energy storage device 428, after being fully charged, be capable of powering the wireless communication device 350 continuously for at least 20 hours.

Also shown in FIG. 7 is a power generator 425 for generating power locally at the site of the multifunction printing system 400. An example of the power generator 425 is solar cell 420 described above relative to FIGS. 5 and 6. An input is provided between the power generator 425 and the energy storage device 428 for receiving locally generated electrical energy for charging the energy storage device 428. In some embodiments, additional charging circuitry (not shown) is provided between the power generator 425 and the energy storage device 428, depending upon the charging requirements of the energy storage device 428. Other ways for generating power locally at the site of the multifunction printing system 400 include using the carriage motor 380 (FIG. 3) to convert motion of the carriage 200 into electrical energy, particularly during deceleration of the carriage 200 at the ends of its back and forth passes. In some embodiments, the energy storage device 428 can be charged using electrical energy provided from the DC power supply 520 and the power management IC 501. An advantage of generating electrical energy by the solar cell 420 for charging the energy storage device 428 is that charging can occur even when the multifunction printing system 400 is in its low power mode, as long as there is sufficient ambient lighting. The solar cell 420 that is about the size of a typical lid 402 for the multifunction printing system 400 can provide around 14 watts of electrical power in daylight conditions, or about 4 watts under indoor lighting conditions that are typically found in an office. In other words, the solar cell 420 generates power under indoor lighting conditions that is greater than the approximately half watt of power used by the wireless communication device 350.

Having described a printing system with wireless communication that can meet energy efficiency requirements without missing image data that is sent during a low power mode, a method of operation can next be described with reference particularly to FIGS. 5-7. In different embodiments, the energy storage device 428 can be charged in either the normal operating mode or in a low power mode, as in the example of charging by power from the solar cell 420. The chip microcontroller 560 determines that printing has not occurred for a predetermined period of time, as measured by a clock that is included in the chip microcontroller 560 or provided separately. When the predetermined period of time has elapsed without printing, the chip microcontroller 560 switches the multifunction printing system 400 into a low power mode in which power provided through an AC line is disconnected from a printing device (e.g. the printhead 250) and from the wireless communication device 350. During the time when the multifunction printing system 400 is in the low power mode, power is provided to the wireless communication device 350 by the energy storage device 428. Even in the low power mode, if image data is sent wirelessly to the multifunction printing system 400, the image data is thereby received through the wireless communication device 350. When image data is received, the chip microcontroller 560 switches the multifunction printing system 400 into its operating mode. Power is then provided from the AC line input to multifunction printing system 400 to the printing device as well as to other subsystems such as motors that were disconnected from power during the low power mode. An image is then printed corresponding to the image data received by the wireless communication device 350 that was sent when multifunction printing system 400 was in its low power mode.

In some embodiments, the wireless communication device 350 is continuously powered during the low power mode. For a solar cell 420 that can generate 4 watts in indoor lighting conditions, a total of 40 watt hours is provided if the lights are on for 10 hours a day. Daylight that enters through the windows of a room that a printer is typically kept in will increase the solar generated energy further. Some of this energy is typically used during low power modes during these same energy generating hours. Typically, however, enough energy is generated to charge the energy storage device 428 sufficiently to power the wireless communication device 350 at its wireless communication operating level of about half a watt continuously for at least 20 hours, and more typically for an entire weekend. For printers housed in a room with no windows where the lights are off all weekend, image data sent wirelessly can still be received and printed.

In other embodiments where it is anticipated that no local power will be generated for a longer time, such as a one-week office shutdown, power from the energy storage device 428 can be provided to wireless communication device 350 on an intermittent basis at the wireless communication operating level of about half a watt. A switch (not shown) between the energy storage device 428 and the wireless communication device 350 can be opened and closed under the direction of the chip microcontroller 560 so that the energy storage device 428 is drained at a slower rate. In the intermittent mode, power is provided from the energy storage device 428 at the wireless communication operating level for a first time interval. Then power is provided from the energy storage device 428 at a level that is less than 20% of the wireless communication operating level for a second time interval. These two steps are repeated cyclically during the time when the multifunction printer 400 is in the low power mode. For example, during a "listen low mode" the wireless communication device 350 uses only about 50 to 80 mW. A typical mobile timeout or PC timeout is about 30 seconds. Typically, the second time interval is greater than the first time interval. As long as the second time interval is less than a predetermined timeout time interval of around 30 seconds (for example by setting second time interval to about 20 seconds), wireless communication device 350 will receive the incoming image data. Once image data begins to be received, microcontroller 560 can keep power supplied between the energy storage device 428 and the wireless communication device 350 at its wireless communication operating level to receive the image data. At this point the chip microcontroller 560 would also typically switch the multifunction printing system 400 into its normal operating mode.

Various printing systems can have different extents of a low power mode. For example, a low power mode can be a standby mode in which power is disconnected between a power supply and a plurality of loads, including the printing device and the media advance system motors. Alternatively the low power mode can be a sleep mode such that one or more of a plurality of DC voltages that are generated when in the operating mode are not generated when the printing system is in the sleep mode.

The invention has been described in detail with particular reference to certain preferred embodiments thereof, but it will be understood that variations and modifications can be effected within the spirit and scope of the invention. For example, embodiments employing inkjet printheads as printing devices have been described. The invention is also applicable to printing systems having different types of printheads, or printing devices including a laser for making marks on the recording medium.

PARTS LIST

10 Inkjet printer system
12 Image data source
14 Controller
15 Image processing unit
16 Electrical pulse source
18 First fluid source 19 Second fluid source
20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
250 Printhead
251 Printhead die
253 Nozzle array
254 Nozzle array direction
256 Encapsulant
257 Flex circuit
258 Connector board
262 Multi-chamber ink supply
264 Single-chamber ink supply

PARTS LIST CONT'D

300 Printing mechanism
301 Printing apparatus
302 Paper load entry direction
303 Print region
304 Media advance direction
305 Carriage scan direction
306 Right side of printing mechanism
307 Left side of printing mechanism
308 Front of printing mechanism
309 Rear of printing mechanism
310 Hole (for paper advance motor drive gear)
311 Feed roller gear
312 Feed roller
313 Forward rotation direction (of feed roller)
315 Housing
320 Pick-up roller
322 Turn roller
323 Idler roller
324 Discharge roller
325 Star wheel(s)
330 Maintenance station
340 Control panel (or user interface)
342 Control button
344 Display
350 Wireless communication device
352 Antenna
370 Stack of media
371 Top piece of medium
380 Carriage motor
382 Carriage guide rail

PARTS LIST CONT'D

383 Encoder fence
384 Belt
390 Printer electronics board
392 Cable connectors
400 Multifunction printing system
402 Lid
404 Outer surface (of lid)
410 Scanning apparatus
412 hinge
414 Reflective backing plate
420 Solar cell
425 Power generator
428 Energy storage device
430 Body (of scanning apparatus)
434 Scanning guide
435 Scanning direction
436 Frame
438 Offset
440 Transparent platen
450 Sensor array module
452 Photosensor array
454 Roller of sensor array module
456 Light source
460 External light source
501 Power management IC
520 DC power supply
525 AC line voltage
530 Discrete components
540 Printhead logic DC voltage source

PARTS LIST CONT'D

550 Printing programmable power supply
560 Chip Microcontroller
570 Dynamic RAM Memory
580 System logic

The invention claimed is:

1. A printing system comprising:
a printing device for printing onto a recording medium;
a media advance system for moving the recording medium into position to be printed on by the printing device when the printing system is in an operating mode;
a connector for receiving AC line voltage;
a power supply for converting the AC line voltage into a plurality of DC voltages;
a wireless communication device for receiving image data;
a controller for controlling printer operation when the printing system is in the operating mode, and for turning off at least one of the plurality of DC voltages when the printing system is in a low power mode; and
an energy storage device for powering the wireless communication device when the printing system is in the low power mode;
further comprising a solar cell for charging the energy storage device.

2. The printing system of claim 1, wherein the solar cell is built into a lid.

3. The printing system of claim 2, wherein the lid includes an outer surface facing away from the printing system, and the outer surface is transparent.

4. The printing system of claim 3, wherein the outer surface is made of glass.

5. The printing system of claim 2, wherein the printing system is a multi-function printer including a printing apparatus and a scanning apparatus, and the lid is pivotably attached to the scanning apparatus.

6. The printing system of claim 1, wherein the solar cell generates power under indoor lighting conditions that is greater than power used by the wireless communication device.

7. The printing system of claim 1, wherein the energy storage device is configured to provide power also to a user interface when the printing system is in the low power mode.

8. The printing system of claim 7, wherein the user interface includes a display.

9. The printing system of claim 7, wherein the user interface includes a touch screen.

10. The printing system of claim 1, wherein the electrical storage device is a rechargeable battery.

11. The printing system of claim 1, wherein the electrical storage device is a capacitor.

12. The printing system of claim 1, wherein the energy storage device, after being fully charged, is capable of powering the wireless communication device continuously for at least 20 hours.

13. The printing system of claim 1, wherein the printing device is an inkjet printhead.

14. The printing system of claim 1, wherein the printing device includes a laser.

15. The printing system of claim 1, wherein the power supply includes:
   a DC power supply for converting the AC line voltage to a predetermined DC voltage; and
   a power management circuit into which the predetermined DC voltage is input and which outputs a plurality of other DC voltages used in the printing system, wherein the plurality of other DC voltages are at lower voltage than the predetermined DC voltage.

16. The printing system of claim 15, wherein the predetermined DC voltage is input into the printing device.

17. The printing system of claim 1, wherein the wireless communication device includes a Wi-Fi device.

\* \* \* \* \*